(12) United States Patent
Shinagawa et al.

(10) Patent No.: US 12,727,977 B2
(45) Date of Patent: Sep. 8, 2026

(54) DENTURE BASE MATERIAL PACKAGE AND METHOD FOR CREATING DENTURE

(71) Applicant: TOKUYAMA DENTAL CORPORATION, Tokyo (JP)

(72) Inventors: Yusaku Shinagawa, Tokyo (JP); Ayumu Gyakushi, Tokyo (JP); Tatsuya Yamazaki, Tokyo (JP)

(73) Assignee: TOKUYAMA DENTAL CORPORATION (JP)

( * ) Notice: Subject to any disclaimer, the term of this patent is extended or adjusted under 35 U.S.C. 154(b) by 288 days.

(21) Appl. No.: 18/285,805

(22) PCT Filed: May 13, 2022

(86) PCT No.: PCT/JP2022/020191
§ 371 (c)(1),
(2) Date: Oct. 5, 2023

(87) PCT Pub. No.: WO2022/244693
PCT Pub. Date: Nov. 24, 2022

(65) Prior Publication Data
US 2024/0366348 A1 Nov. 7, 2024

(30) Foreign Application Priority Data
May 18, 2021 (JP) ................................ 2021-083894

(51) Int. Cl.
*A61C 13/01* (2006.01)
*B65D 1/34* (2006.01)
*B65D 81/18* (2006.01)

(52) U.S. Cl.
CPC .......... *A61C 13/04* (2013.01); *A61C 2202/01* (2013.01); *B65D 1/34* (2013.01); *B65D 81/18* (2013.01)

(58) Field of Classification Search
CPC ....... A61C 13/00; A61C 13/007; A61C 13/01; A61C 13/04; A61C 13/087; A61C 13/10;
(Continued)

(56) References Cited

U.S. PATENT DOCUMENTS 4,768,951 A 9/1988 Abiru et al.
5,304,062 A 4/1994 Saitoh et al.
(Continued)

FOREIGN PATENT DOCUMENTS

CA 3063024 A1 12/2019
JP H1-120819 U1 8/1989
(Continued)

OTHER PUBLICATIONS

International Search Report (English and Japanese) issued in PCT/JP2022/020191, mailed Jul. 26, 2022; ISA/JP (5 pages).
(Continued)

*Primary Examiner* — Bryon P Gehman
(74) *Attorney, Agent, or Firm* — Harness, Dickey & Pierce, P.L.C.

(57) ABSTRACT

Provided are a denture base material package capable of improving operation efficiency while securing quality, without being influenced by an operator's skill level, in the production of a denture by a production method for a denture involving using a reference denture, and a production method for a denture involving using the same. A denture base material package includes: a string-shaped molded body obtained by molding a photocurable denture base material having plastic deformability into a string shape; and a light-shielding member having an internal space kept airtight, and accommodating the string-shaped molded body in the internal space. The light-shielding member includes (i) a tray having a groove for accommodating the string-shaped molded body, and (ii) at least one kind of member
(Continued)

selected from the group consisting of: a bag body configured to house the tray thereinside; and a lid member configured to seal an opening of the groove.

18 Claims, 5 Drawing Sheets

(58) Field of Classification Search
CPC ......... A61C 13/20; A61C 19/00; A61C 19/02; A61C 2202/00; A61C 2202/01; A61C 13/0001; A61C 13/0022; B65D 1/34; B65D 81/18
USPC .......................................................... 206/63.5
See application file for complete search history.

(56) References Cited

U.S. PATENT DOCUMENTS

| | | | | |
|---|---|---|---|---|
| 6,730,246 | B2 * | 5/2004 | Price | A61C 13/04 425/176 |
| 7,040,885 | B2 * | 5/2006 | Price | A61C 13/04 425/176 |
| 2009/0130624 | A1 * | 5/2009 | Sun | A61F 5/566 433/48 |
| 2016/0324604 | A1 | 11/2016 | McDonald et al. | |
| 2016/0367348 | A1 | 12/2016 | Allred et al. | |
| 2017/0258560 | A1 | 9/2017 | Llop | |
| 2017/0360534 | A1 | 12/2017 | Sun et al. | |
| 2019/0053883 | A1 | 2/2019 | Sun et al. | |
| 2022/0347927 | A1 * | 11/2022 | Kono | A61C 13/04 |

FOREIGN PATENT DOCUMENTS

| | | | |
|---|---|---|---|
| JP | H05-192353 | A | 8/1993 |
| JP | 3449733 | B2 | 9/2003 |
| JP | 2004-285023 | A | 10/2004 |
| JP | 2017-064012 | A | 4/2017 |
| JP | 2017-512613 | A | 5/2017 |
| JP | 6294706 | B2 | 3/2018 |
| JP | 2019-521188 | A | 7/2019 |
| RU | 2714434 | C1 | 2/2020 |
| WO | 2010-135374 | A2 | 11/2010 |
| WO | 2010-135374 | A3 | 3/2011 |
| WO | 2018/207867 | A1 | 11/2018 |
| WO | 2020/195623 | A1 | 10/2020 |

OTHER PUBLICATIONS

European Search Report issued in the corresponding European Patent Application No. 22804605.8; dated Sep. 24, 2024 (total 11 pages).
Office Action issued in the corresponding Russian Patent Application No. 2023133155; dated Jul. 29, 2025 (total 14 pages).
Office Action issued in the corresonding Japanese Patent Application No. 2023-522632; mailed Apr. 28, 2026 (total 8 pages).

* cited by examiner

DENTURE BASE MATERIAL PACKAGE AND METHOD FOR CREATING DENTURE

CROSS REFERENCE TO RELATED APPLICATIONS

This application is a 371 U.S. National Phase of International Application No. PCT/JP2022/020191, filed on May 13, 2022, which claims priority to Japanese Patent Application No. 2021-083894, filed May 18, 2021. The entire disclosures of the above applications are incorporated herein by reference.

BACKGROUND

Technical Field

The present invention relates to a denture base material package and a production method for a denture.

Related Art

Along with the rapid population aging in recent years, there is an increasing demand for dentures. Here, the denture (plate denture) means a removable prosthetic appliance for restoring oral functions such as mastication and preventing disorders caused by a facial morphological change, defects of teeth, and loss of surrounding tissue when natural teeth and surrounding tissue such as gingiva and alveolar bone are lost. In the denture, a member for making up for defective (natural) teeth corresponds to artificial teeth, and a member for making up for lost surrounding tissue corresponds to a denture base. In the denture base, a surface that is brought into close contact with an alveolar ridge mucosa (surface that is not polished from the viewpoint of adaptability in production of a denture) is generally called a "mucosal surface" (or a basal surface), a surface that may be brought into contact with at least one of a buccal mucosa or the tongue on the opposite side (surface that is polished in production of a denture) is generally called a "polished surface", and a portion serving as the boundary between the above-mentioned surfaces is called a "denture border". In addition, a boundary portion between a portion of the denture base corresponding to the gum and the artificial teeth is called a "cervical line", and a portion forming a wing-like form having the cervical line as a proximal end and having the above-mentioned denture border as a distal end is called a "flange". Further, a portion of the denture base to which artificial teeth are fixed is called an "alveolar portion".

Dentures are usually produced one by one in conformity with the shape of an oral cavity of a patient while making fine adjustments by a manual operation. As a technology of producing a denture by reducing labor of the above-mentioned manual operation, there has also been known a technology involving using a reference denture (see JP 3449733 B2, JP 6294706 B2, and WO 2018/207867 A1). Here, the reference denture is a "ready-made" denture-like member to be used for facilitating the production of a denture, and includes a reference denture base and artificial teeth that are fixed and held on the reference denture base. When the reference denture is worn in the oral cavity of an individual patient (to be a wearer) or a model thereof, a space (the space is hereinafter sometimes referred to as "reference denture unfitted space") is formed between a mucosal surface of the reference denture base and a mucosa in the oral cavity of the individual patient. Then, the above-mentioned space is filled with a curable denture base material such as a liner. Thus, a denture fitted to the individual patient can be produced. The term "ready-made" as used herein means that the reference denture is commercially available as a component product. In addition, the reference denture formed of the ready-made denture-like member does not usually require a large number of variations in tooth arrangement and the like, and often includes a plurality of kinds of members which are different only in relative dimension (size). For example, the reference denture formed of the ready-made denture-like member is often provided as reference dentures of several standard sizes, such as an S-size, an M-size, and an L-size. In addition, as the reference denture, there is often used a reference denture for a full denture (complete denture) in which the entire dentition is fixed.

There is also known a method of efficiently producing a denture having a high fitting property to an individual patient through use of such reference denture. For example, in WO 2020/195623 A1, there is described "a production method for a denture, including: (A) a reference denture preparation step of preparing a reference denture serving as a reference denture member including a reference denture base member and artificial teeth; (B) a reference denture determination step of determining a shape of a reference denture to be used by (1) inserting the reference denture into an oral cavity of a patient so as to place the reference denture at an appropriate position on an imaginary occlusal plane assumed as an occlusal plane arranged at a position at which the occlusal plane is medically supposed to be present in the oral cavity of the patient, to thereby check a contact state between a mucosa in the oral cavity of the patient and the reference denture or (2) inserting the reference denture into an articulator having a patient oral cavity model attached thereto so as to place the reference denture at an appropriate position on an imaginary occlusal plane assumed as an occlusal plane arranged at a position at which the occlusal plane is medically supposed to be present in the oral cavity of the patient, to thereby check a contact state between the patient oral cavity model and the reference denture, selecting, in a case of an inappropriate contact in use, a reference denture having another shape that is prevented from causing the inappropriate contact or finely adjusting a shape of the reference denture base member in the reference denture so as to prevent the contact; (C) a building and transfer step of building a curable denture base material in an uncured state for forming the adjusting member on a mucosal surface of the reference denture base member in the reference denture determined to be used in the reference denture determination step, then placing the reference denture having the curable denture base material built thereon at an appropriate position on the imaginary occlusal plane in the oral cavity of the patient or the articulator, and transferring a mucosal shape of the oral cavity of the patient or a shape of the patient oral cavity model onto the curable denture base material and simultaneously forming a margin to remove the excess curable denture base material; and (D) a curing step of curing the curable denture base material that has undergone the building and transfer step. The building and transfer step (C) includes: (C1) a central building and transfer step of building the curable denture base material in an uncured state in a base central region of the reference denture base member and transferring the shape of the oral cavity of the patient or the shape of the patient oral cavity model; (C2) an anterior building and transfer step of building the curable denture base material in an uncured state in the base anterior region of the reference denture base member, and transferring the shape of the oral cavity of the patient or the shape of the patient oral cavity model and simultaneously extending the curable denture base material in an uncured state from a denture border to form a margin; and (C3) a posterior building and transfer step of building the curable denture base material in an uncured state in the base posterior region of the reference denture base member, and transferring the shape of the oral cavity of the patient or the shape of the patient oral cavity model and simultaneously extending the curable denture base material in an uncured state from a denture border to form a margin. After the central building and transfer step is performed, the anterior building and transfer step and the posterior building and transfer step are performed simultaneously or individually."

According to the above-mentioned production method for a denture as described in WO 2020/195623 A1, a denture fitted to an individual patient can be produced much more efficiently than by a conventional production method for a made-to-order denture. However, as a result of an investigation made by the inventors of the present invention, it has been found that, in the case where an attempt is made to produce a denture through utilization of the above-mentioned production method, operation efficiency and quality are liable to be reduced in the building and transfer step (C) when an operator (dentist or dental technician) who performs the production of a denture is an inexperienced operator as compared to an operator experienced in the production of a denture.

The present invention has been made in view of the above-mentioned circumstances, and an object of the present invention is to provide a denture base material package capable of improving operation efficiency while securing a certain or higher quality, without being influenced by an operator's skill level or the like, in the production of a denture by such a production method for a denture involving using a reference denture as exemplified in WO 2020/195623 A1 or the like, and a production method for a denture involving using the same.

SUMMARY

The above-mentioned object is achieved by embodiments of the present invention to be described below.

According to one embodiment of the present invention, there is provided a denture base material package (hereinafter sometimes referred to as "package") including: a string-shaped molded body obtained by molding a photocurable denture base material having plastic deformability into a string shape; and a light-shielding member having an internal space kept airtight, and accommodating the string-shaped molded body in the internal space, wherein the light-shielding member includes: (i) a tray having a groove for accommodating the string-shaped molded body; and (ii) at least one kind of member selected from the group consisting of: a bag body configured to house the tray thereinside; and a lid member configured to seal an opening of the groove.

In the denture base material package according to one embodiment of the present invention, it is preferred that the string-shaped molded body have a cross-sectional area falling within a range of from 20 $mm^2$ to 65 $mm^2$.

In the denture base material package according to another embodiment of the present invention, it is preferred that a cross-sectional shape of the string-shaped molded body in a cross-section orthogonal to a longitudinal direction thereof be a semicircular shape or a crescent shape.

In the denture base material package according to another embodiment of the present invention, it is preferred that a planar shape of the string-shaped molded body defined by the groove be linear or looped.

In the denture base material package according to another embodiment of the present invention, it is preferred that, when a denture is produced by using: the string-shaped molded body; and a reference denture having (i) a mucosal surface that is a surface facing an alveolar ridge mucosa, (ii) a polished surface that is a surface capable of being brought into contact with at least one of a buccal mucosa or a tongue, and (iii) a denture border that forms a boundary between the mucosal surface and the polished surface, a planar shape of the string-shaped molded body defined by the groove be a shape corresponding to at least a part of a planar shape of the denture border of the reference denture.

In the denture base material package according to another embodiment of the present invention, it is preferred that the planar shape of the string-shaped molded body defined by the groove be a looped shape corresponding to the planar shape of the denture border of the reference denture.

In the denture base material package according to another embodiment of the present invention, it is preferred that the reference denture include a maxillary reference denture, and, in the maxillary reference denture, (1) when a length of a line segment PQ connecting a point P corresponding to a left pterygomaxillary notch of the denture border on a throat side and a point Q corresponding to a right pterygomaxillary notch of the denture border on the throat side is defined as 1, a line segment OM connecting a point O corresponding to an upper lip frenulum, which corresponds to a midline portion of the denture border on a labial side, and a midpoint M of the line segment PQ have a length of from 0.76 to 0.98, and (2) when points that equally divide a line segment OP connecting the point O and the point P into four parts are designated as a point P1, a point P2, and a point P3 from the point O side, and points at which perpendicular lines from the point P1, the point P2, and the point P3 on the line segment OP intersect the denture border on a left buccal side are designated as a point D1, a point D2, and a point D3, respectively, and points that equally divide a line segment OQ connecting the point O and the point Q into four parts are designated as a point Q1, a point Q2, and a point Q3 from the point O side, and points at which perpendicular lines from the point Q1, the point Q2, and the point Q3 on the line segment OQ intersect the denture border on a right buccal side are designated as a point E1, a point E2, and a point E3, respectively, a line segment P1D1 and a line segment Q1E1 each have a length of from 0.11 to 0.36, a line segment P2D2 and a line segment Q2E2 each have a length of from 0.19 to 0.45, and a line segment P3D3 and a line segment Q3E3 each have a length of from 0.16 to 0.45.

In the denture base material package according to another embodiment of the present invention, it is preferred that the reference denture include a mandibular reference denture, and, in the mandibular reference denture, (1) when a length of a line segment pq connecting a point "p" corresponding to a left retromolar pad of the denture border on a throat side and a point "q" corresponding to a right retromolar pad of the denture border on the throat side is defined as 1, a line segment om connecting a point "o" corresponding to a lower lip frenulum, which corresponds to a midline portion of the denture border on a labial side, and a midpoint m of the line segment pq have a length of from 0.74 to 0.94, (2) when points that equally divide a line segment op connecting the point "o" and the point "p" into four parts are designated as a point p1, a point p2, and a point p3 from the point t "o"

side, and points at which perpendicular lines from the point p1, the point p2, and the point p3 on the line segment op intersect the denture border on a left buccal side are designated as a point d1, a point d2, and a point d3, respectively, and points that equally divide a line segment og connecting the point "o" and the point "q" into four parts are designated as a point q1, a point q2, and a point q3 from the point "o" side, and points at which perpendicular lines from the point q1, the point q2, and the point q3 on the line segment og intersect the denture border on a right buccal side are designated as a point e1, a point e2, and a point e3, respectively, a line segment p1d1 and a line segment q1e1 each have a length of from 0.11 to 0.32, a line segment p2d2 and a line segment q2e2 each have a length of from 0.13 to 0.34, and a line segment p3d3 and a line segment q3e3 each have a length of from 0.14 to 0.33, and (3) when points at which perpendicular lines from the point p1, the point p2, and the point p3 on the line segment op intersect the denture border on the throat side are designated as a point b1, a point b2, and a point b3, respectively, and points at which perpendicular lines from the point q1, the point q2, and the point q3 on the line segment og intersect the denture border on the throat side are designated as a point c1, a point c2, and a point c3, respectively, a line segment d1b1 and a line segment e1c1 each have a length of from 0.14 to 0.40, a line segment d2b2 and a line segment e2c2 each have a length of from 0.19 to 0.41, and a line segment d3b3 and a line segment e3c3 each have a length of from 0.21 to 0.42.

According to one embodiment of the present invention, there is provided a production method for a denture including: a building and transfer step of (A) building a photocurable denture base material having plastic deformability in at least one building target region on a reference denture, the reference denture having (i) a mucosal surface that is a surface facing an alveolar ridge mucosa, (ii) a polished surface that is a surface capable of being brought into contact with at least one of a buccal mucosa or a tongue, and (iii) a denture border that forms a boundary between the mucosal surface and the polished surface, the at least one building target region being selected from at least a part of the denture border and at least a part of the mucosal surface, and then, (B1) placing the reference denture having the photocurable denture base material built thereon at an appropriate position in an oral cavity of a patient, and then transferring a mucosal shape of the oral cavity of the patient onto the photocurable denture base material and simultaneously forming a margin to remove the excess photocurable denture base material, or (B2) placing the reference denture having the photocurable denture base material built thereon at an appropriate position on an imaginary occlusal plane in an articulator having a patient oral cavity model attached thereto, and then transferring a shape of the patient oral cavity model onto the photocurable denture base material and simultaneously forming a margin to remove the excess photocurable denture base material; and a curing step of curing the photocurable denture base material after the building and transfer step, wherein, when the photocurable denture base material is built on the building target region, the photocurable denture base material to be used is the string-shaped molded body taken out of the denture base material package according to one embodiment of the present invention.

In the production method for a denture according to one embodiment of the present invention, it is preferred that, when the photocurable denture base material is built in a region including at least a part of the denture border, a planar shape of the string-shaped molded body defined by the groove be a shape corresponding to a planar shape of the at least a part of the denture border.

Advantageous Effects of Invention

According to the present invention, the denture base material package capable of improving operation efficiency without being influenced by the operator's skill level or the like in the production of the denture by such a production method for a denture involving using the reference denture as exemplified in WO 2020/195623 A1 or the like, and the production method for a denture involving using the same can be provided.

BRIEF DESCRIPTION OF THE DRAWINGS

FIG. 1(*a*) is an illustration of the shape of the maxillary reference denture in plan view and corresponds to FIG. 12 of WO 2020/195623 A1, and FIG. 1(*b*) is an illustration of the shape of the mandibular reference denture in plan view and corresponds to FIG. 13 of WO 2020/195623 A1.

FIG. 2(*a*) is a vertical sectional view of the maxillary denture at an approximately central portion of a canine, and FIG. 2(*b*) is a vertical sectional view of the mandibular denture at an approximately central portion of a canine.

FIG. 3(*a*) is a perspective plan view of the package, and FIG. 3(*b*) is an end view for illustrating a cross-sectional structure between reference symbols $Z_A$-$Z_A'$ shown FIG. 3(*a*).

FIG. 4(*a*) is a perspective plan view of the package, and FIG. 4(*b*) is an end view for illustrating a cross-sectional structure between reference symbols $Z_B$-$Z_B'$ shown in FIG. 4(*a*).

FIG. 5(*a*) is a perspective plan view of the package, and FIG. 5(*b*) is an end view for illustrating a cross-sectional structure between reference symbols $Z_C$-$Z_C'$ shown in FIG. 5(*a*).

DETAILED DESCRIPTION

Figures 1A, 1B:
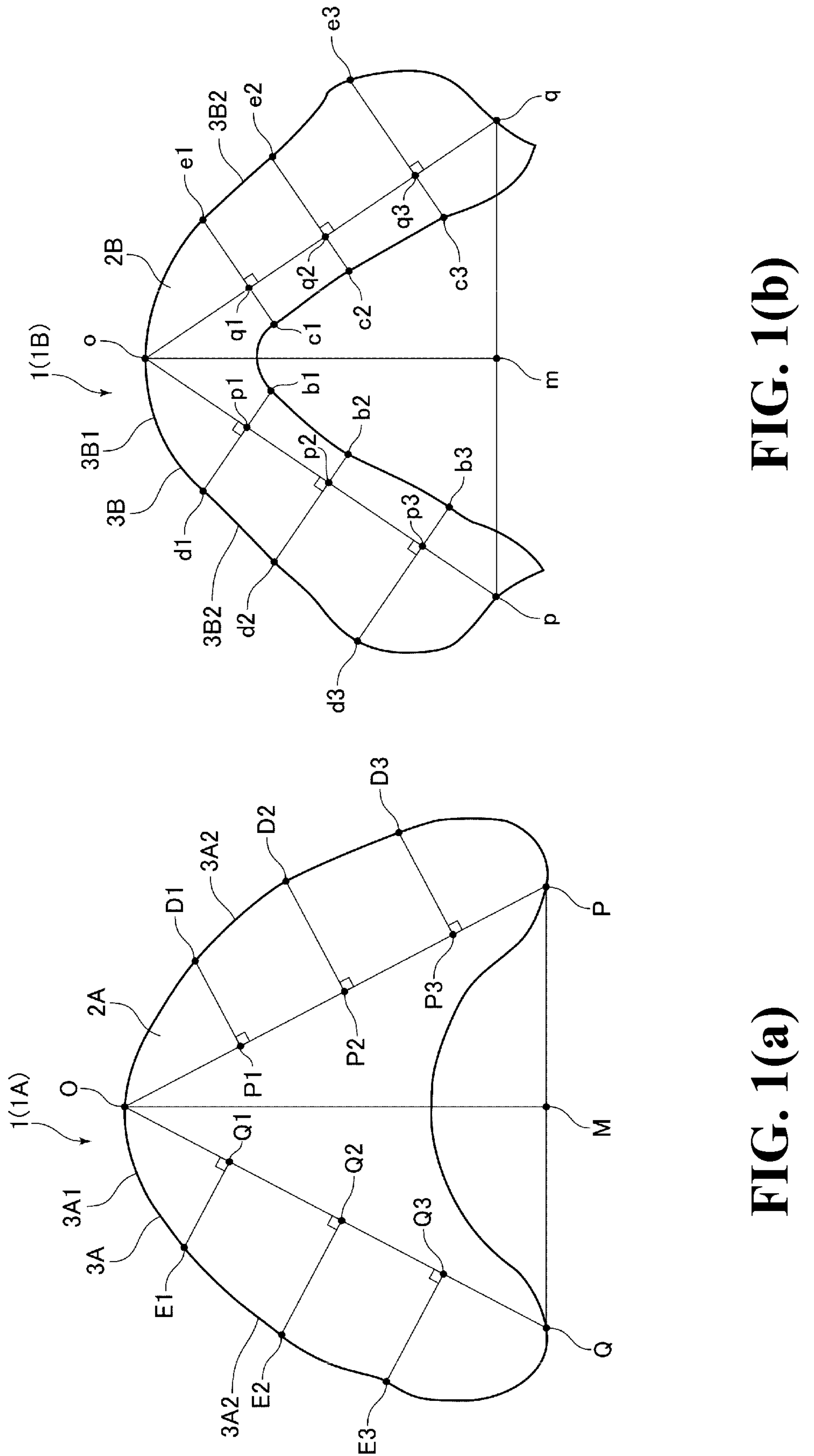
FIGS. 1(*a*) and 1(*b*) are views for illustrating the length of each portion defining a preferred planar shape of each of a maxillary reference denture and a mandibular reference denture as described in WO 2020/195623 A1.

In order to find a method of achieving the above-mentioned object, the inventors of the present invention have investigated the reason why, in performing the building and transfer step (C) in the production method for a denture as described in WO 2020/195623 A1, an inexperienced operator is liable to reduce operation efficiency and quality as compared to a skilled operator.

First, in the building and transfer step (C), it is preferred from the viewpoint of workability that a curable denture base material (in an uncured state) be mounted in a region where building and transfer are performed (building and transfer region) in a slightly larger volume than the volume of the reference denture unfitted space. In this case, as the curable denture base material, there may be utilized a chemical polymerization-type massive material prepared by mixing a powder material and a liquid at the time of use, or a photopolymerization-type massive material packaged in advance. In addition, in order to suppress a wasteful use of the curable denture base material, there is a need to repeat an operation of adjusting the shape of the curable denture base material by scraping off the curable denture base material mounted in the building and transfer region in small amounts through use of a paddle or a spatula. In this case, an excess or deficiency in local mounting amount is liable to occur. In addition, when a single mounting amount is too small, mounting needs to be repeated any number of times to stack layers, and hence the formation of a gap at an interface between the stacked layers or partial peeling is liable to occur. Conceivably for such reason, an inexperienced operator, as compared to a skilled operator, is liable to reduce operation efficiency and quality in performing the building and transfer step (C), in particular, the building and transfer step (C2) and/or (C3), in which a fine molding operation is required. In addition, it is conceived that those problems similarly occur also when a building and transfer step is performed in a production method for a denture other than the production method for a denture as described in WO 2020/195623 A1.

In view of the foregoing, on the basis of the above-mentioned finding, the inventors of the present invention have conceived that it is effective for achieving the above-mentioned object to satisfy the following conditions (i) and (ii), and have found a package according to an embodiment of the present invention described later.

(i) A photocurable denture base material is used as the curable denture base material.

(ii) A photocurable denture base material molded into a string shape is provided to an operator so that a certain amount of the photocurable denture base material may be easily mounted in the building and transfer region.

Through use of the photocurable denture base material molded into a string shape (string-shaped molded body) in the building and transfer step (C), anyone can accurately grasp the amount of the photocurable denture base material to be used for the building and transfer on the basis of the length of the string-shaped molded body regardless of the operator's skill level or the like. In this case, it becomes easier to build the curable denture base material in the building and transfer region in an amount without an excess or a deficiency. Then, as a result, it becomes easy to improve operation efficiency while securing a certain or higher quality, without being influenced by the operator's skill level or the like.

As described above, the package according to this embodiment is suitably used for improving operation efficiency while securing a certain or higher quality, regardless of an operator's skill level or the like, in the building and transfer step (C), in particular, the building and transfer step (C2) and/or (C3), in the production method for a denture involving using the reference denture exemplified in WO 2020/195623 A1 or the like. However, the usage mode of the package according to this embodiment is not limited to the use in the production of a denture involving using the reference denture exemplified in WO 2020/195623 A1 or the like, and of course, the package may be suitably utilized also in the case of performing a building and transfer step in a production method for a denture involving using "any other reference denture" other than the reference denture exemplified in WO 2020/195623 A1 or the like. In addition, even when the package is used in the building and transfer step (C2) and/or (C3) of the production method for a denture involving using the reference denture as described in WO 2020/195623 A1, its use method is not particularly limited.

The package according to this embodiment is used in the case of performing a building and transfer step in a production method for a denture involving using a reference denture. In addition, the package exhibits a remarkable effect when used in the building and transfer step (C2) and/or (C3) in the production method for a denture involving using the reference denture as described in WO 2020/195623 A1. Accordingly, prior to the description of the details of the package according to this embodiment, brief description is given of the technical contents described in WO 2020/195623 A1 regarding the reference denture and the production method for a denture involving using the reference denture (in particular, the building and transfer step). Then, on the premise of the description of those contents, the details of the package according to this embodiment are described. However, the description of the technical contents described in WO 2020/195623 A1 is made merely for the purpose of facilitating the understanding of the package according to this embodiment by the reader of the description etc. of the present application.

In the description etc. of the present application, the expression "from x to y" using numerical values "x" and "y" means "x or more and y or less" unless otherwise stated. When only the numerical value "y" has a unit attached thereto in such expression, the unit also applies to the numerical value "x". In addition, in the description etc. of the present application, the term "(meth)acrylic" means both of "acrylic" and "methacrylic". Similarly, the term "(meth)acrylate" means both of "acrylate" and "methacrylate", and the term "(meth)acryloyl" means both of "acryloyl" and "methacryloyl".

1. With Regard to Reference Denture

A reference denture is a member including a reference denture base member and artificial teeth fixed and held on the reference denture base member, and having a mucosal surface that is a surface facing an alveolar ridge mucosa, a polished surface that is a surface capable of being brought into contact with at least one of a buccal mucosa or the tongue, and a denture border that forms a boundary between the mucosal surface and the polished surface. In addition, the string-shaped molded body serving as an object to be packaged in the package according to this embodiment is used for improving workability at the time of building the curable denture base material on the reference denture. As a specific example of the reference denture, the reference denture as described in WO 2020/195623 A1 is described below with reference to FIGS. 1(*a*) and 1(*b*). The contents disclosed in WO 2020/195623 A1 are incorporated herein by reference.

FIG. 1(*a*) is a view for illustrating the shape of a maxillary reference denture as described in WO 2020/195623 A1 in plan view, and is a view for illustrating the length of each portion defining a preferred planar shape. FIG. 1(*b*) is a view for illustrating the shape of a mandibular reference denture as described in WO 2020/195623 A1 in plan view, and is a view for illustrating the length of each portion defining a preferred planar shape. For convenience of description, under a state in which a denture is worn in the oral cavity of a patient, in the denture, a direction on a labial side (upper side as illustrated in FIG. 1(*a*) and FIG. 1(*b*)) is hereinafter defined as an "anterior side", and a direction on a throat side (lower side as illustrated in FIG. 1(*a*) and FIG. 1(*b*)) is hereinafter defined as a "posterior side". In addition, left and right directions refer to directions as viewed from the patient side, and specifically, a "right side" refers to a left side as illustrated in FIG. 1(*a*) and a right side as illustrated in FIG. 1(*b*), and a "left side" refers to a right side as illustrated in FIG. 1(*a*) and a left side as illustrated in FIG. 1(*b*). In addition, in the oral cavity of the patient, the right cheek is positioned on the "right side" of the reference denture, and the left cheek is positioned on the "left side" of the reference denture.

As illustrated in FIG. 1(*a*) and FIG. 1(*b*), in the following description, a point corresponding to a left pterygomaxillary notch on a posterior denture border (denture border on the throat side) regarding a maxillary reference denture 1A, and a point corresponding to a left retromolar pad on a posterior denture border (denture border on the throat side) regarding a mandibular reference denture 1B are defined as first reference points: P (p) for an upper jaw (lower jaw), respectively. Similarly, a point corresponding to a right pterygomaxillary notch on a posterior denture border (denture border on the throat side) in the maxillary reference denture 1A, and a point corresponding to a right retromolar pad on a posterior denture border (denture border on the throat side) in the mandibular reference denture 1B are defined as second reference points: Q (g) for an upper jaw (lower jaw), respectively. Further, points corresponding to upper (lower) lip frenula, which correspond to the midline portion of the labial denture border 3A1, 3B1, are defined as third reference points: O (○) for an upper jaw (lower jaw), respectively. In addition, the length of a line segment: PQ (pq) connecting P (p) and Q (q) is defined as a reference length. The preferred planar shape means such a shape that the lengths from a plurality of points P1 (p1), P2 (p2), P3 (p3), Q1 (q1), Q2 (q2), and Q3 (q3) defined at predetermined positions on two reference line segments OP (op) and OQ (og) connecting the third reference point to the first reference point and the second reference point, respectively, to the denture border 3A, 3B (the details thereof are described later), and the length of a line segment OM (om) when a midpoint of the line segment PQ (pq) is represented by M (m) are set so that ratios of the lengths to the above-mentioned reference length fall within predetermined ranges. The above-mentioned reference points and plurality of points are not necessarily present on the same plane. However, the height difference with respect to the length of each line segment defining the shape is small, and hence the reference points and plurality of points are regarded to be present on a planar shape in the description of the present application.

Now, the above-mentioned plurality of points P1 (p1), P2 (p2), P3 (p3), Q1 (q1), Q2 (q2), and Q3 (q3) and the length from each of the points P1 (p1), P2 (p2), P3 (p3), Q1 (q1), Q2 (q2), and Q3 (q3) to the denture border 3A, 3B (relative length standardized in the case where the reference length is set to 1) are described regarding each of the maxillary reference denture 1A and the mandibular reference denture 1B.

1-2. With regard to Preferred Planar Shape of Maxillary Reference Denture 1A As illustrated in FIG. 1(*a*), the respective points P1, P2, P3, Q1, Q2, and Q3 of the maxillary reference denture 1A are three points (points P1, P2, and P3 from the anterior side (point O side) to the posterior side) which are present on the line segment OP and which equally divide the line segment into four parts, and three points (points Q1, Q2, and Q3 from the anterior side (point O side) to the posterior side) which are present on the line segment OQ and which equally divide the line segment into four parts. Then, points, which intersect the anterior denture border 3A (in other words, the denture border on each of a right buccal side and a left buccal side) when perpendicular lines to the line segment OP or the line segment OQ on which the points P1, P2, P3, Q1, Q2, and Q3 are present are drawn, are determined. In this case, points that intersect the left side (right side as illustrated) of the denture border 3A are determined for the points on the line segment OP, and points that intersect the right side (left side as illustrated) of the denture border 3A are determined for the points on the line segment OQ. Specifically, points D1, D2, and D3 are determined as the points corresponding to the points P1, P2, and P3, and similarly, points E1, E2, and E3 are determined as the points corresponding to the points Q1, Q2, and Q3. In addition, the length from each of the points P1, P2, P3, Q1, Q2, and Q3 to the denture border 3A means the relative length of each of a line segment P1D1, a line segment P2D2, a line segment P3D3, a line segment Q1E1, a line segment Q2E2, and a line segment Q3E3 with respect to the line segment PQ.

Specifically, the preferred planar shape of the maxillary reference denture 1A is such a shape that the relative length of the line segment OM is from 0.76 to 0.98, the relative length of each of the line segment P1D1 and the line segment Q1E1 is from 0.11 to 0.36, the relative length of each of the line segment P2D2 and the line segment Q2E2 is from 0.19 to 0.45, and the relative length of each of the line segment P3D3 and the line segment Q3E3 is from 0.16 to 0.45. The maxillary reference denture 1A having such shape is preferred when a denture is produced by using the package according to this embodiment.

1-3. With regard to Preferred Planar Shape of Mandibular Reference Denture 1B As illustrated in FIG. 1(*b*), the points p1, p2, p3, q1, q2, q3, and "m" of the mandibular reference denture 1B are points respectively corresponding to the points P1, P2, P3, Q1, Q2, Q3, and M, which are the respective points of the maxillary reference denture 1A. In addition, the length from each of the points p1, p2, p3, q1, q2, q3, and "m" to the denture border 3B includes the length between each point and the anterior denture border 3B, and the length between the anterior denture border 3B and the posterior denture border 3B including each point as a point passed through. The lengths between the respective points and the anterior denture border 3B (in other words, the denture border on each of the left buccal side, the right buccal side, and a lower lip frenulum side) are the line segment p1d1, the line segment p2d2, the line segment p3d3, the line segment q1e1, the line segment q2e2, the line segment q3e3, and the line segment om, which respectively correspond to the line segment P1D1, the line segment P2D2, the line segment P3D3, the line segment Q1E1, the line segment Q2E2, the line segment Q3E3, and the line segment OM of the maxillary reference denture 1A. In addition, the length between the anterior denture border 3B and the posterior denture border 3B including each of the points p1, p2, p3, q1, q2, and q3 as a point passed through is defined as described below.

That is, first, points, which intersect the posterior denture border 3B when perpendicular lines to the line segment op or the line segment og on which the points p1, p2, p3, q1, q2, and q3 are present are drawn, are determined. Specifically, b1, b2, and b3 are determined as the points corresponding to p1, p2, and p3, and c1, c2, and c3 are determined as the points corresponding to q1, q2, and q3. In this case, the lengths between the anterior denture border 3B and the posterior denture border 3B are the relative lengths with respect to the line segment pq of line segments connecting intersections of the denture borders 3B on both sides with the respective points p1, p2, p3, q1, q2, and q3 interposed therebetween, that is, a line segment d1b1, a line segment d2b2, a line segment d3b3, a line segment e1c1, a line segment e2c2, and a line segment e3c3.

Specifically, the preferred planar shape of the mandibular reference denture 1B is such a shape that the relative length of the line segment om is from 0.74 to 0.94, the relative length of each of the line segment p1d1 and the line segment q1e1 is from 0.11 to 0.32, the relative length of each of the line segment p2d2 and the line segment q2e2 is from 0.13 to 0.34, the relative length of each of the line segment p3d3 and the line segment q3e3 is from 0.14 to 0.33, the relative length of each of the line segment d1b1 and the line segment e1c1 is from 0.14 to 0.40, the relative length of each of the line segment d2b2 and the line segment e2c2 is from 0.19 to 0.41, and the relative length of each of the line segment d3b3 and the line segment e3c3 is from 0.21 to 0.42. The mandibular reference denture 1B having such shape is preferred when a denture is produced by using the package according to this embodiment. In the preferred planar shape described above, from the positional relationship of the respective points, d1b1>p1d1, e1c1>q1e1, d2b2>p2d2, e2c2>q2e2, d3b3>p3d3, and e3c3>q3e3 are satisfied.

1-4. With Regard to Cross-Sectional Shape of Reference Denture

Figure 2B:
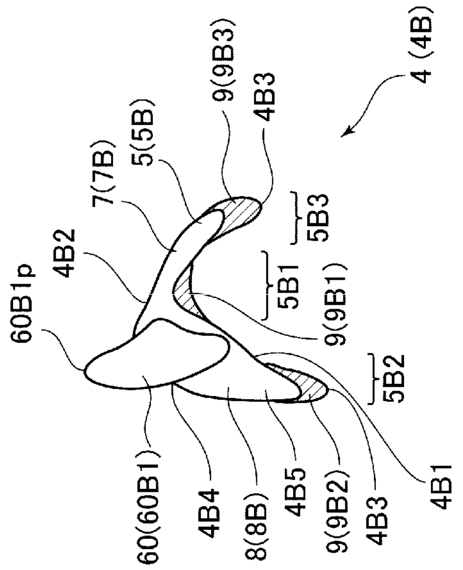
FIGS. 2(*a*) and 2(*b*) are sectional views of a maxillary denture and a mandibular denture of a complete denture type produced by a method as described in WO 2020/195623 A1 through use of the maxillary reference denture and the mandibular reference denture illustrated in FIGS. 1(*a*) and 1(*b*), respectively, and correspond to FIGS. 1(*a*) and 1(*b*) of WO 2020/195623 A1.
Figure 2B:
Figure 2A:
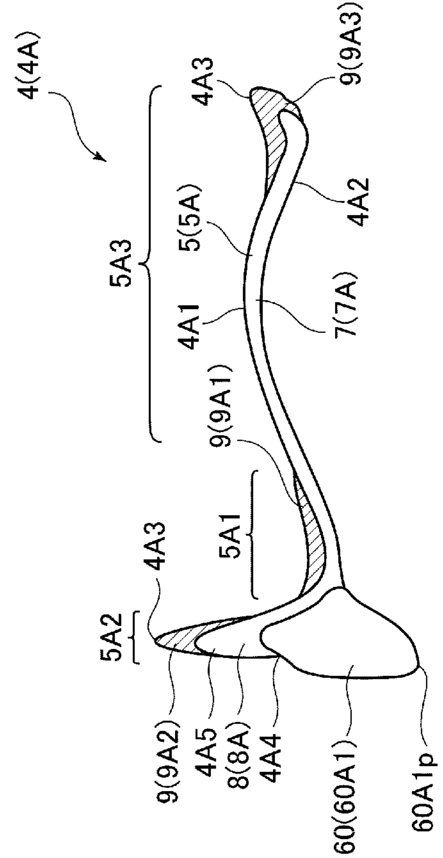

The cross-sectional shape of the maxillary reference denture 1A (or the mandibular reference denture 1B) illustrated in FIG. 1(*a*) (or FIG. 1(*b*)) corresponds to a shape obtained by excluding adjusting members 9 illustrated as shaded portions in FIGS. 2(*a*) and 2(*b*) from a maxillary denture 4A (or a mandibular denture 4B) illustrated in FIG. 2(*a*) (or FIG. 2(*b*)). In other words, the reference denture 1A, 1B and the denture 4A, 4B have a common structure in terms of including a reference denture base member 7A, 7B and an artificial tooth 60A, 60B held and fixed on the portion corresponding to the gum in the reference denture base member 7A, 7B. In this case, the adjusting members 9 are each a cured product obtained by curing the string-shaped molded body (photocurable denture base material) built and subjected to transfer on the reference denture 1A, 1B in the building and transfer step (C). In addition, the denture border 3A, 3B, mucosal surface, and polished surface of the reference denture 1A, 1B illustrated in FIG. 1 correspond to a denture border 4A3, 4B3, a mucosal surface 4A1, 4B1, and a polished surface 4A2, 4B2 of the denture 4A, 4B illustrated in FIGS. 2(*a*) and 2(*b*), respectively. In addition, the distal end portion of the denture border 4A3, 4B3 faces the mucosal surface 4A1, 4B1 side, and the distal end portion of the denture border 3A, 3B also faces the mucosal surface side.

2. Production Method for Denture involving using Reference Denture and Denture obtained by the Method With reference to FIGS. 2(*a*) and 2(*b*), in the method as described in WO 2020/195623 A1, a denture is produced by the following procedure. That is, for the reference denture 1A, 1B determined to be used through a reference denture preparation step (A) and a reference denture determination step (B), the curable denture base material is built at a predetermined position on the mucosal surface 4A1, 4B1 of the reference denture base member 7A, 7B thereof, followed by the transfer of the shape of the oral cavity of a patient thereonto and the formation of a margin, in the building and transfer step (C), and then the curable denture base material is cured in a curing step (D). Thus, such a denture as illustrated in FIGS. 2(*a*) and 2(*b*) is produced. In this case, the step (C) is performed for each of (C1) a base central region 5A1, 5B1, (C2) a base anterior region (anterior flange portion) 5A2, 5B2, and (C3) a base posterior region 5A3, 5B3 of the reference denture base member 7A, 7B, and the curable denture base material cured in the respective regions become the respective adjusting members 9 in the denture 4A, 4B, that is, (C1) a central adjusting member 9A1, 9B1, (C2) an anterior adjusting member 9A2, 9B2, and (C3) a posterior adjusting member 9A3, 9B3, to thereby produce the denture 4A, 4B fitted to the shape of the oral cavity of each patient.

In the building and transfer step (C) as described in WO 2020/195623 A1, the building has been performed by mounting the curable denture base material in the form of a paste in small amounts through use of a dental paddle or spatula. A skilled operator who can assume the final shapes of the adjusting members 9 can mount the curable denture base material in appropriate amounts assuming those shapes, and besides, in such shapes as to be less deformed at the time of the transfer, and hence can perform the transfer and the formation of a margin with high accuracy without requiring much labor. However, a case in which an inexperienced operator performs the building operation takes labor, and has resulted in a difference in workmanship as well in some cases. That is, when the mounting amount of the curable denture base material is small, there is a need to repeat an operation of further performing additional mounting after the transfer, and then performing the transfer again. In this case, the operation causes the occurrence of an excess or deficiency in local mounting amount, or the formation of a gap at an interface between layers or the occurrence of partial peeling at the time of the transfer when layers of the curable denture base material are stacked. In addition, in contrast, when the mounting amount is too large, the transfer is difficult to perform, and hence there is a need to repeat an operation of performing the transfer again with the mounting amount reduced. Further, even when the transfer can be performed, a bulged-out portion goes to waste, which is not economical, and further, a difference has occurred in a transfer state as well in some cases.

3. With Regard to Overview of Package According to This Embodiment

The package according to this embodiment has a great feature in that a photocurable denture base material having plastic deformability serving as a body to be packaged can be supplied in a state of having been molded into a string-shaped molded body at the time of the production of a denture. Through use of the string-shaped molded body, anyone can easily grasp the accurate amount of the photocurable denture base material to be used for the building and transfer in terms of the length of the string-shaped molded body. Consequently, regardless of the operator's skill level or the like, the optimal amount of the photocurable denture base material can be built and subjected to the transfer on a building and transfer surface with extreme ease. In addition, at the time of the building and transfer, the amount of the photocurable denture base material to be built and subjected to the transfer can be adjusted, the string-shaped molded body can be built on the building and transfer surface in a stacked state so as for the photocurable denture base material to be built and subjected to the transfer in correspondence to the shape of the building and transfer surface, and the string-shaped molded body can be built on the building and transfer surface while being appropriately deformed. Accordingly, the use of the string-shaped molded body can improve operation efficiency while securing a certain or higher quality, without being influenced by the operator's skill level or the like, in the production of a denture by a production method for a denture involving using a reference denture.

The insides of the oral cavities of patients vary in size, and hence the reference denture to be used for the production of a denture is often provided as reference dentures of several standard sizes, such as an S-size, an M-size, and an L-size. In addition, when a denture is produced by using a reference denture having a small size, the amount of the photocurable denture base material required for the building and transfer step is relatively small, and when a denture is produced by using a reference denture having a large size, the amount of the photocurable denture base material required for the building and transfer step is relatively large. In consideration of those points, the string-shaped molded body preferably has a predetermined cross-sectional area so that the photocurable denture base material is easily subjected to the building and transfer in an appropriate amount without an excess or a deficiency with respect to a reference denture of each size. The "cross-sectional area" means the cross-sectional area of a cross-section of the string-shaped molded body orthogonal to its lengthwise direction.

In this connection, the inventors of the present invention have made further investigations on a particularly suitable range of the predetermined cross-sectional area for improving operation efficiency while securing a certain or higher quality, without being influenced by an operator's skill level or the like. To that end, the inventors of the present invention have investigated the amount of the photocurable denture base material required in the building and transfer step (C) from the viewpoint of further facilitating the transfer and the formation of a margin while avoiding excessive use of the photocurable denture base material (while saving waste) in the case of producing a denture through use of a reference denture. As a result, the inventors of the present invention have found that it is preferred that the amount of the photocurable denture base material required in the building and transfer step (C) be set to from about 1.1 times to about 1.5 times as large as the maximum value of the cross-sectional area of each of the adjusting members 9 (for filling the reference denture unfitted space) in the denture to be produced. Then, the inventors of the present invention have made further investigations by applying this finding to the building and transfer step (C2) and/or (C3). As a result, the inventors of the present invention have recognized that, when the cross-sectional area of the string-shaped molded body is from 20 $mm^2$ to 65 $mm^2$, even when the usage amount of the photocurable denture base material is slightly excessive in those steps, the need to add the photocurable denture base material (i.e., a deficiency in usage amount) is less liable to arise.

Accordingly, the cross-sectional area of the string-shaped molded body is preferably from 20 $mm^2$ to 65 $mm^2$, more preferably from 22 $mm^2$ to 60 $mm^2$, still more preferably from 24 $mm^2$ to 55 $mm^2$. In this case, for example, the entirety of each of the above-mentioned ranges of the cross-sectional area from the lower limit value to the upper limit value may be divided into a plurality of narrower ranges, and each division may be assigned to correspond to a reference denture of each size. For example, a string-shaped molded body having a cross-sectional area equal to the lower limit value or slightly larger than the lower limit value may be used for an S-size reference denture, and string-shaped molded bodies having cross-sectional areas ranging from the lower limit value to the vicinity of the middle value may be used for S-size and M-size reference dentures.

In addition, when the cross-sectional area of the string-shaped molded body is set to from 20 $mm^2$ to 65 $mm^2$, for example, in the production method for a denture as described in WO 2020/195623 A1, various effects described below can be achieved. First, when the reference denture unfitted space in each of the base anterior region 5A2, 5B2 and the base posterior region 5A3, 5B3 in the reference denture base member 7A, 7B included in the reference denture 1A, 1B is filled with the string-shaped molded body, the occurrence of a deficiency or excess in usage amount of the photocurable denture base material (string-shaped molded body) to be used can be further reduced. In addition, when (C1) building is performed for the base central region 5A1, 5B1, the central building and transfer step (C1) can be easily performed without waste in the following manner: members each of which has been obtained by cutting the string-shaped molded body to an appropriate length are placed at an appropriate interval so as not to cause waste in consideration of spreadability, and are then pressed against an oral mucosa or a model.

In addition, when the string-shaped molded body is a linear member, the member can be placed in a uniform amount (or thickness) along the line of any shape while being bent. Consequently, also in the anterior building and transfer step (C2) and/or the posterior building and transfer step (C3), the operation is simplified in the following manner: the linear string-shaped molded body is appropriately cut when its length is long, and is used by being appropriately added when its length is deficient. In addition, in the case where the cross-sectional area of the string-shaped molded body is set to from 20 $mm^2$ to 65 $mm^2$, it becomes easier to perform the building and transfer step (C2) and/or (C3) without the photocurable denture base material being added when used for any of reference dentures of several standard sizes, such as an S-size, an M-size, and an L-size. Consequently, a variation in workmanship at the part at which the building and transfer have been performed among operators is further suppressed.

Further, any shape, such as a linear or looped shape, may be selected as the planar shape of the string-shaped molded body defined by the groove of a tray described later, but the planar shape is preferably (1) a shape corresponding to at least a part of the planar shape of the denture border of the reference denture, more preferably (2) a looped shape corresponding to the planar shape of the denture border of the reference denture. When the shape set forth in the above-mentioned item (1) or (2) is adopted as the planar shape of the string-shaped molded body, the string-shaped molded body is placed on and brought into close contact with a line along the top portion of the denture border 3A, 3B in, for example, the following manner: under a state in which the string-shaped molded body is still accommodated in the tray, the reference denture 1A, 1B is placed thereon. After that, the string-shaped molded body is taken out of the groove. Thus, the string-shaped molded body (photocurable denture base material) can be uniformly placed without being displaced from the above-mentioned line. Consequently, the building and transfer step (C2) and/or (C3) can be performed in a simpler manner.

Effects identical or similar to the effects described above can be similarly obtained in a reference denture and a production method for a denture involving using the reference denture other than the reference denture and production method for a denture involving using the reference denture as described in WO 2020/195623 A1.

The cross-sectional area of the string-shaped molded body is not always required to be constant with respect to the lengthwise direction of the string-shaped molded body, but is preferably constant with respect to the lengthwise direction from the viewpoint of the production efficiency of the package. The term "constant" as used herein means (1) completely constant (the variation in cross-sectional area with respect to the longitudinal direction is 0%), or (2) approximately constant (the variation in cross-sectional area with respect to the longitudinal direction is within ±10%, preferably within ±5% (excluding exactly 0%)). In addition, the length (L) of the string-shaped molded body is not particularly limited, but is usually preferably from 50 mm to 400 mm, preferably from 50 mm to 400 mm. In addition, when the string-shaped molded body is a looped member assumed to be used up in a single time of use, the length (L) thereof is preferably set to a length corresponding to the entire length of the denture border 3A, 3B of the reference denture 1A, 1B. Further, the ratio (L/D) of the length (L) of the string-shaped molded body to the maximum width (D) of the cross-section of the string-shaped molded body orthogonal to the longitudinal direction thereof is usually preferably 4 or more, preferably from 4 to 48, more preferably from 5 to 36.

In addition, the cross-sectional shape of the string-shaped molded body in the cross-section orthogonal to the longitudinal direction thereof is not particularly limited, and may be, for example, a circular shape, but is preferably a shape that approximates the cross-sectional shape of a cured product after the string-shaped molded body has been built and subjected to the transfer on the reference denture, and cured (corresponding to each of the adjusting members 9 in FIGS. 2(*a*) and 2(*b*)). Such cross-sectional shape is, for example, a semicircular shape or a crescent shape. Herein, the "semicircular shape" means not only (i) a semicircular shape having a central angle of 180°, but also (ii) an approximately semicircular shape having a central angle of from about 160° to about 200° (excluding a central angle of exactly) 180°, preferably from about 170° to about 190° (excluding a central angle of exactly 180°), (iii) an approximately semi-elliptical shape having a central angle of from about 160° to about 200° (excluding a central angle of exactly 180°), preferably from about 170° to about 190° (excluding a central angle of exactly) 180°, and (iv) a shape that approximates any one of (i) to (iii). In addition, the "crescent shape" means the shape of a nonoverlapping portion when two circles that may be different from each other in diameter are placed so as to partially overlap each other with the centers of the circles not coinciding with each other, or a shape that approximates the above-mentioned shape. When the cross-sectional shape is a semicircular shape or a crescent shape, the transfer and the formation of a margin can be further facilitated.

Further, as compared to a circular cross-sectional shape, a semicircular or crescent cross-sectional shape is particularly advantageous when the string-shaped molded body is built and subjected to the transfer along the top of the denture border 3A, 3B of the reference denture 1A, 1B. The reason for this is as described below. First, the contour line of the semicircular cross-sectional shape is made up of an arc portion formed of a curve protruding so as to be convex in one direction, like a circular arc or an elliptical arc, and a chord portion formed of a linear shape, a V-shape, or an inverted V-shape, which connects both ends of the arc portion, and the contour line of the crescent cross-sectional shape is made up of an arc portion formed of a curve protruding so as to be convex in one direction, like a circular arc or an elliptical arc, and a chord portion formed of a curve connecting both ends of the arc portion. In addition, the denture border of the reference denture has a convex cross-sectional shape protruding toward the mucosal surface side. Accordingly, when a string-shaped molded body having a circular cross-sectional shape is placed on the top portion of the denture border 3A, 3B, and the string-shaped molded body is deformed so as to cover the vicinity of the top portion of the denture border 3A, 3B, to thereby perform the formation of a margin, a large deformation operation is required. In contrast, when a string-shaped molded body having a semicircular or crescent cross-sectional shape is placed on the top portion of the denture border 3A, 3B so as for the central portion of the chord portion of the cross-sectional contour line to face the top portion of the denture border 3A, 3B, and the string-shaped molded body is deformed so as to cover the vicinity of the top portion of the denture border 3A, 3B, to thereby perform the formation of a margin, the deformation operation can be made smaller. Accordingly, workability at the time of the formation of a margin can be improved more when the cross-sectional shape is a semicircular shape or crescent shape than when the cross-sectional shape is a circular shape.

In the package according to this embodiment, a photocurable material having plastic deformability is used as a curable denture base material. Such material is usually in the form of a paste containing a liquid component, and hence the string-shaped molded body is accommodated in the internal space of a light-shielding member having an internal space kept airtight. When the member for accommodating the string-shaped molded body does not have a light-shielding property, curing of the photocurable denture base material due to ambient light is unavoidable. In addition, when the member for accommodating the string-shaped molded body does not have airtightness, the decrease of a volatile component, liquid leakage, or the like may occur. The term "airtight" as used herein means a state in which, under a usual handling, transportation, or storage state, solid or liquid foreign matter does not enter from the outside, and loss or evaporation of the contents housed in the internal space can be prevented. However, the following is permitted: a gas (e.g., oxygen in air) in such a minute amount as not to have an adverse influence on the storage of the contents permeates a constituent member, such as a film or a partition wall, of the light-shielding member.

The light-shielding member to be used in the package according to this embodiment includes: (i) a tray having a groove for accommodating the string-shaped molded body; and (ii) at least one kind of member selected from the group consisting of: a bag body configured to house the tray thereinside; and a lid member configured to seal an opening of the groove. The tray has a feature in having a groove for accommodating the string-shaped molded body to define the planar shape of the string-shaped molded body, and to prevent the deformation of the cross-sectional shape of the string-shaped molded body. The use of such tray can prevent the deformation of the cross-sectional shape of the string-shaped molded body at the time of the production or distribution of the package according to this embodiment.

In the package according to this embodiment, the string-shaped molded body is required to be accommodated in a space in which a light-shielding property and airtightness are secured. Accordingly, (a) when the light-shielding member is formed of a tray and a bag body, a bag body having a light-shielding property and airtightness is used. The tray may or may not have a light-shielding property. (b) In addition, when the light-shielding member is formed of a tray and a lid member, a tray having a light-shielding property and a lid member having a light-shielding property are used. Then, airtightness is secured by sealing the opening of the groove of the tray with the lid member in a hermetic manner.

(c) Further, when the light-shielding member is formed of a bag body, a tray, and a lid member, a light-shielding property and airtightness are secured in any one of a first mode to a fourth mode described below. (c1) First, as the first mode, there is given a mode using a bag body having a light-shielding property and airtightness (e.g., a black plastic bag having a hermetic sealing mechanism such as a zipper). In this case, the tray and the lid member may or may not have a light-shielding property. In addition, the airtightness of the internal space formed by the tray and the lid member may be secured, or the airtightness may not be secured. (c2) As the second mode, there is given a mode using a bag body having no light-shielding property but having airtightness (e.g., a transparent plastic bag having a hermetic sealing mechanism such as a zipper). In this case, a tray having a light-shielding property and a lid member having a light-shielding property are used. In addition, in the case where the opening of the groove of the tray is sealed with the lid member, as long as the opening is sealed so that external light does not enter the internal space formed by the tray and the lid member, the airtightness of the internal space may be secured, or may not be secured.

(c3) As the third mode, there is given a mode using a bag body having a light-shielding property but not having airtightness (e.g., a black plastic bag not having a hermetic sealing mechanism such as a zipper). In this case, airtightness is secured by sealing the opening of the groove of the tray with the lid member in a hermetic manner. The tray and the lid member may or may not have a light-shielding property. (c4) As the fourth mode, there is given a mode using a bag body not having a light-shielding property and airtightness (e.g., a transparent plastic bag not having a hermetic sealing mechanism such as a zipper). In this case, a tray having a light-shielding property and a lid member having a light-shielding property are used. In addition, airtightness is secured by sealing the opening of the groove of the tray with the lid member in a hermetic manner.

In the package according to this embodiment, it is particularly preferred that a tray and a lid member each having a light-shielding property be placed in a bag body having a light-shielding property and airtightness, and the opening of the groove of the tray be sealed with the lid member in a hermetic manner. In this case, a light-shielding property and airtightness can be doubly secured in each of the bag body and the member that is the combination of the tray and the lid member. Accordingly, even when the bag body is broken at the time of the storage or transportation of the package, a light-shielding property and airtightness can still be secured by virtue of the tray and the lid member.

4. With regard to Specific Examples of Package according to This Embodiment

Now, by taking as an example the package according to this embodiment adopting a looped string-shaped molded body or a linear string-shaped molded body as the body to be packaged, specific examples of the package according to this embodiment are described in detail with reference to FIGS. 3(*a*) and 3(*b*) to FIGS. 5(*a*) and 5(*b*).

Figures 3A, 3B:
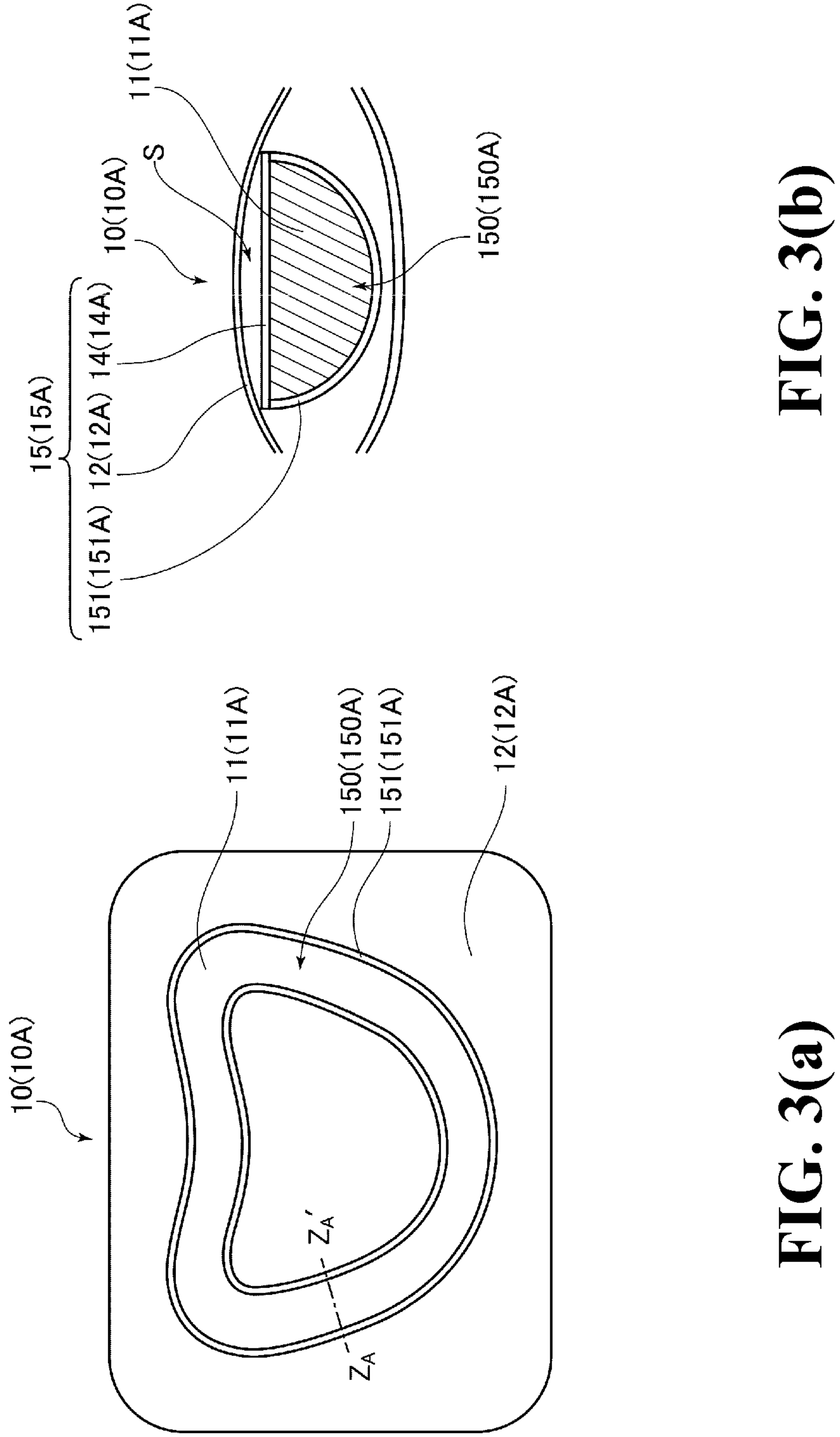
FIGS. 3(*a*) and 3(*b*) are views for schematically illustrating a package according to one embodiment of the present invention, the package having accommodated therein a looped string-shaped molded body corresponding to the planar shape of a denture border of the maxillary reference denture as described in WO 2020/195623 A1.
Figures 4A, 4B:
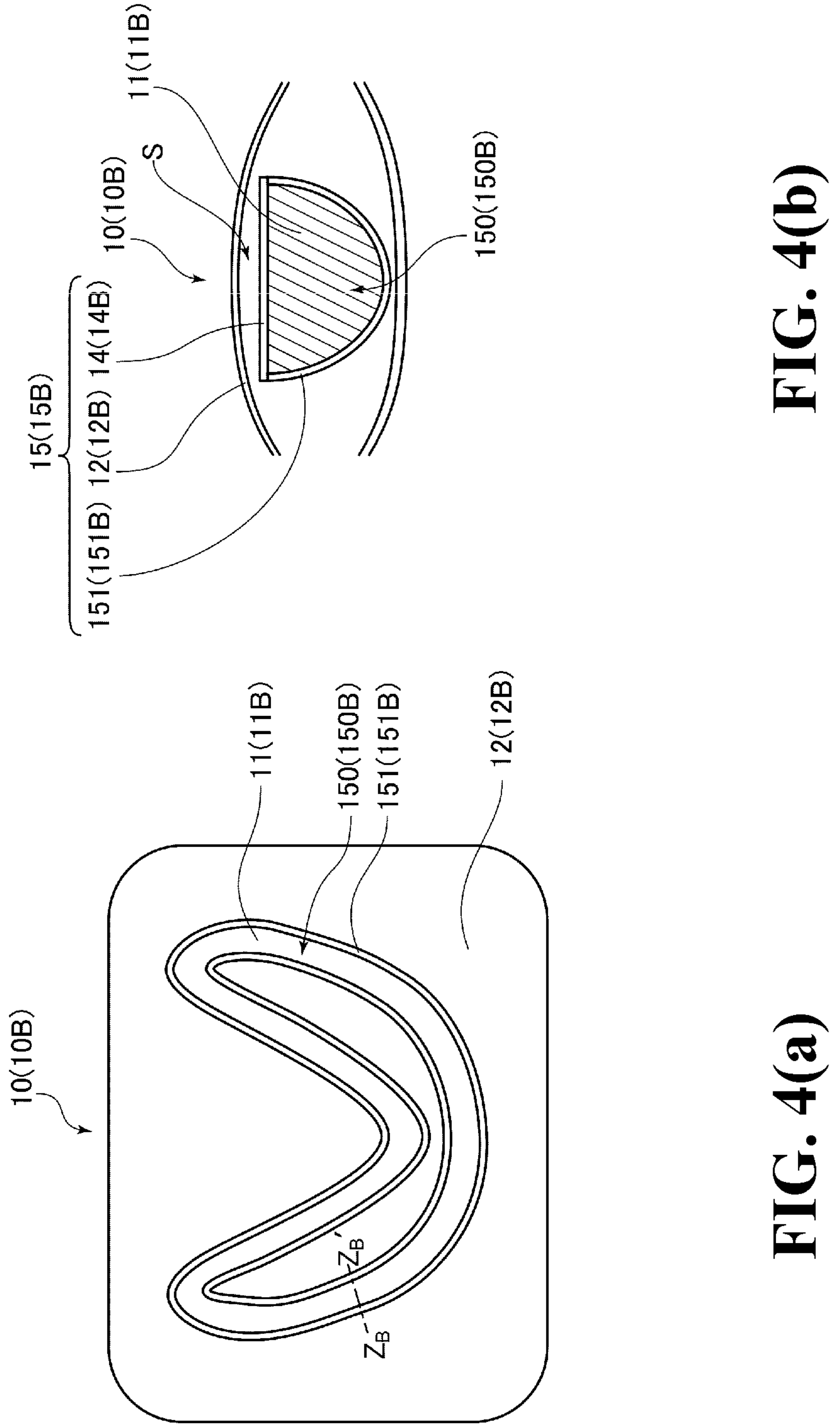
FIGS. 4(*a*) and 4(*b*) are views for schematically illustrating a package according to one embodiment of the present invention, the package having accommodated therein a looped string-shaped molded body corresponding to the planar shape of a denture border of the mandibular reference denture as described in WO 2020/195623 A1.

FIGS. 3(*a*) and 3(*b*) are views for schematically illustrating a package having accommodated therein a looped string-shaped molded body corresponding to the planar shape of the denture border 3A of the maxillary reference denture 1A, FIG. 3(*a*) is a perspective plan view thereof, and FIG. 3(*b*) is a sectional view of a portion indicated by reference symbols $Z_A$-$Z_A$' in FIG. 3(*a*). FIGS. 4(*a*) and 4(*b*) are views for schematically illustrating a package having accommodated therein a looped string-shaped molded body corresponding to the planar shape of the denture border 3B of the mandibular reference denture 1B, FIG. 4(*a*) is a perspective plan view thereof, and FIG. 4(*b*) is a sectional view of a portion indicated by reference symbols $Z_B$-$Z_B$' in FIG. 4(*a*).

Figure 5B:
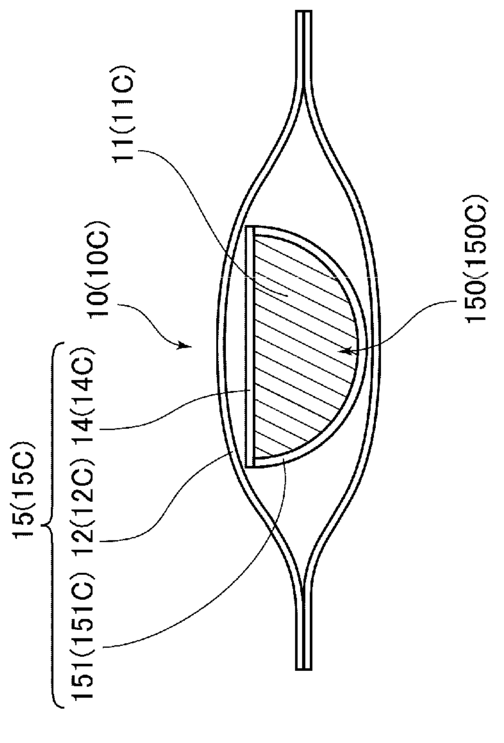
FIGS. 5(*a*) and 5(*b*) are views for schematically illustrating a package according to one embodiment of the present invention, the package having accommodated therein a linear (or rodlike) string-shaped molded body corresponding to the planar shape of a denture border of a maxillary and mandibular reference denture as described in WO 2020/195623 A1.
Figure 5A:
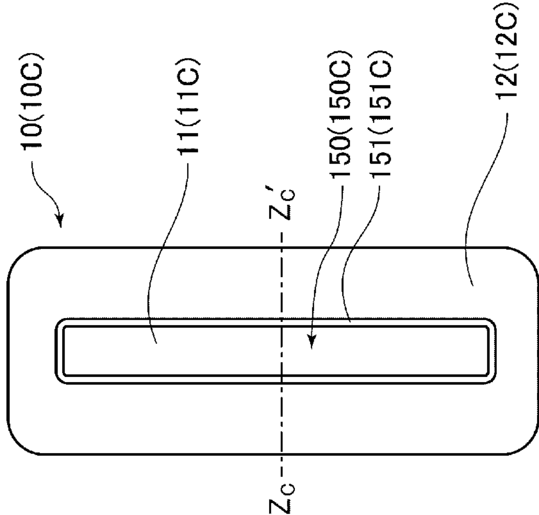

In addition, FIGS. 5(*a*) and 5(*b*) are views for schematically illustrating a package having accommodated therein a linear (i.e., rodlike) string-shaped molded body that can be utilized for the production of a denture 4 involving using any of the maxillary reference denture 1A and the mandibular reference denture 1B, FIG. 5(*a*) is a perspective plan view thereof, and FIG. 5(*b*) is a sectional view of a portion indicated by reference symbols $Z_C$-$Z_C$' in FIG. 5(*a*).

The dimensional ratio of each component in each of those figures is not necessarily matched with the dimensional ratio in the actual package. For example, for convenience of description, the thickness of a bag body 12 is illustrated as thicker than the actual one.

As illustrated in FIGS. 3(*a*) and 3(*b*) to FIGS. 5(*a*) and 5(*b*), a package 10 according to this embodiment includes a string-shaped molded body 11 and a light-shielding member 15 having an internal space kept airtight and accommodating the string-shaped molded body 11 in the internal space. In addition, the string-shaped molded body 11 is formed of a member obtained by molding a photocurable denture base material in the form of a paste having plastic deformability into a string shape having a predetermined cross-sectional area, cross-sectional shape, and length. In addition, the light-shielding member 15 includes the bag body 12, a tray 151, and a lid member 14. Here, the tray 151 and the lid member 14 for sealing the opening of a groove 150 of the tray 151 are placed inside the bag body 12. In addition, the tray 151 has the groove 150 for accommodating the string-shaped molded body 11 to define the planar shape of the string-shaped molded body 11, and to prevent the deformation of the cross-sectional shape of the string-shaped molded body 11.

The photocurable denture base material for forming the string-shaped molded body 11 is not particularly limited as long as the photocurable denture base material is a denture base material having photocurability, and for example, a material as disclosed in WO 2020/195623 A1 may be used without any particular limitation. Such photocurable denture base material usually contains at least: <1> a polymerizable monomer (monomer component) formed of a (meth)acrylate-based monomer, such as methyl (meth)acrylate, ethyl (meth)acrylate, 2-(meth)acryloxyethyl propionate, ethylene glycol di(meth)acrylate, nonaethylene glycol di(meth)acrylate, or trimethylolpropane tri(meth)acrylate; <2> a photopolymerization initiator, such as camphorquinone, benzil, diacetyl, or cyclobutenedione; and <3> an organic filler, such as polymethyl (meth)acrylate or polyethyl (meth)acrylate, and further contains <4> an inorganic filler, such as silica, alumina, or quarts glass, or other additive components as required. The photocurable denture base material before curing is a material capable of plastic deformation, and is also a material capable of holding its shape under a state in which no external stress is applied.

The property of being capable of plastic deformation described above is expressed when, for example, a part of the organic filler such as polymethyl (meth)acrylate (i) dissolves in the polymerizable monomer, (ii) softens by being swollen with the polymerizable monomer, or (iii) undergoes an interaction similar to the above-mentioned item (ii). The photocurable denture base material is preferably such a material that a cured body thereof has an elastic modulus of from 0.50 GPa to 3.0 GPa. This allows the denture to follow the deflection of the jawbone accompanying the opening and closing of the oral cavity while minimizing the deformation of the denture due to a stress generated when a patient masticates, and hence it becomes extremely easy to obtain a satisfactory wearing sensation. In order to cause the elastic modulus of the cured body to fall within the above-mentioned range, the photocurable denture base material preferably contains 20 parts by mass to 80 parts by mass of an organic filler having a molecular weight of from 50,000 to 1,000,000 with respect to 100 parts by mass of the polymerizable monomer. In addition, in this case, from the viewpoint that the photocurable denture base material capable of plastic deformation can be easily obtained, it is preferred to use, as the polymerizable monomer, a polymerizable monomer having a molecular weight of 500 or less.

As one mode in which the string-shaped molded body 11 is accommodated in the light-shielding member 15 while keeping airtightness, the tray 151 is covered with the lid member 14 under a state in which the string-shaped molded body 11 is accommodated in the groove 150. The lid member 14 only needs to cover the opening of the tray 151, that is, the entirety of the groove 150 in plan view.

A material for each of the tray 151, the lid member 14, and the bag body 12 is appropriately selected from resin materials and metal materials in accordance with the modes of light-shielding and hermetic closing, but a general-purpose thermoplastic resin, such as polyethylene, polypropylene, or polyethylene terephthalate, is usually used. In the case of imparting a light-shielding property thereto, a deposited film or sheet obtained by depositing aluminum from the vapor, or a laminated film or sheet obtained by laminating an aluminum film is suitably used. Such laminated film or sheet particularly preferably has a sealant layer because hermetic closing or hermetic sealing can be performed by heat sealing, and more preferably has a layer formed of a material that does not allow the permeation of the polymerizable monomer contained in the string-shaped molded body 11 (photocurable denture base material).

In the case of using the bag body 12 having a light-shielding property, from the viewpoint that oxygen present in a gap S in the bag body 12 has a function of inhibiting the polymerization of the string-shaped molded body 11 (photocurable denture base material) at the time of storage, it is preferred that a general-purpose thermoplastic resin, such as polyethylene, polypropylene, or polyethylene terephthalate, having some degree of oxygen permeability be used as the material for each of the tray 151 and the lid member 14. Particularly in the case of using a polymerizable monomer having a molecular weight of 500 or less for the photocurable denture base material, and using the bag body 12 having a light-shielding property, the tray 151 and the lid member 14 are each preferably formed from, for example, a material having low permeability for a volatile polymerizable monomer and having some degree of oxygen permeability, such as polyethylene terephthalate. This makes it easy to suppress a reduction in plastic deformability of the string-shaped molded body 11 due to the permeation of the volatile polymerizable monomer through the tray 151 and the lid member 14.

In addition, the thickness of each of the bag body 12, the tray 151, and the lid member 14 only needs to be appropriately determined within such a range as not to easily fracture, and as not to obstruct the operation of taking out the string-shaped molded body 11. In addition, the tray 151 preferably has appropriate flexibility or elasticity for being lightly pushed (pressed) with a finger to be deformed so that the string-shaped molded body 11 thereinside may be pushed out to be easily taken out. From such viewpoint, the thickness of the tray 151 preferably falls within the range of from 100 μm to 2,000 μm. In addition, the thickness of the lid member 14 is preferably from 5 μm to 250 μm from the viewpoint of the ease with which the operation of removing the lid member 14 from the tray 151 is performed. Further, the thickness of the bag body 12 is preferably from 5 μm to 250 μm from the viewpoint that the bag body 12 is easy to open.

The cross-sectional shape of a cross-section of the groove 150 orthogonal to its longitudinal direction (hereinafter abbreviated simply as "cross-sectional shape") is preferably (i) a semicircular shape, (ii) an approximately semicircular shape, (iii) a semi-elliptical shape, (iv) an approximately semi-elliptical shape, or (v) a shape that approximates any one of (i) to (iv). In each of FIG. 3(*b*), FIG. 4(*b*), and FIG. 5(*b*), which are sectional views represented by a $Z_A$-$Z_A$' cross-section, a $Z_B$-$Z_B$' cross-section, and a $Z_C$-$Z_C$' cross-section in FIG. 3(*a*), FIG. 4(*a*), and FIG. 5(*a*), the groove 150 illustrated has an approximately semicircular shape as its cross-sectional shape. In particular, when building is performed on the peripheral edge portion of the mucosal surface of the maxillary reference denture 1A (i.e., the denture border 3A), the cross-sectional shape of a groove 150A preferably has a width (chord length) of from 8 mm to 12 mm, and preferably has a height of from 5 mm to 7 mm. In addition, when building is performed on the peripheral edge portion of the mucosal surface of the mandibular reference denture 1B (i.e., the denture border 3B), the cross-sectional shape of a groove 150B preferably has a width of from 5 mm to 8 mm, and preferably has a height of from 5 mm to 8 mm.

In addition, the string-shaped molded body 11 can be easily obtained by, for example, subjecting the photocurable denture base material to extrusion molding or press molding. In addition, the cross-sectional area and cross-sectional shape of the cross-section of the string-shaped molded body 11 orthogonal to its longitudinal direction, and the length of the string-shaped molded body 11 may be adjusted by appropriately selecting molding conditions. For example, in the extrusion molding, the string-shaped molded body 11 having a desired cross-sectional area and cross-sectional shape and having any length can be obtained through use of a die, and hence the string-shaped molded body 11 thus obtained only needs to be appropriately cut to a desired length. Further, as required, the string-shaped molded body 11 after being cut to a desired length may be appropriately bent so as to have a looped shape formed of a desired planar shape, and then both ends of the string-shaped molded body 11 may be connected. In addition, in the case of the press molding, through use of a predetermined mold, the linear or looped string-shaped molded body 11 having a desired cross-sectional area, cross-sectional shape, length, and planar shape can be obtained in accordance with the shape of the mold.

The string-shaped molded body 11 accommodated in the light-shielding member 15 has its planar shape defined by the groove 150 of the tray 151, and has its cross-sectional shape prevented thereby from being deforming. Accordingly, the cross-sectional shape of the string-shaped molded body 11 (the shape of the arc portion of the cross-sectional contour line of the cross-sectional shape) has a shape "matched" with the cross-sectional shape of the groove 150. Here, in each of the examples illustrated in FIG. 3(*b*), FIG. 4(*b*), and FIG. 5(*b*), the cross-sectional shape of the string-shaped molded body 11 has a semicircular shape having a central angle of 180°. In addition, from the viewpoint of more reliably preventing the deformation of the cross-sectional shape of the string-shaped molded body 11, it is more preferred that the cross-sectional shape of the string-shaped molded body 11 (the shape of the chord portion of the cross-sectional contour line of the cross-sectional shape) have a shape "matched" with the cross-sectional shape of the inner wall surface of the lid member 14. In this case, the term "matched" means completely matched or approximately matched. In each of those figures, there is illustrated a mode in which: the cross-sectional shape of the string-shaped molded body 11 is completely matched with the cross-sectional shapes of the inner wall surfaces of the groove 150 and the lid member 14; the entire surface of the arc portion of the cross-sectional contour line of the string-shaped molded body 11 is brought into close contact with the inner wall surface of the groove 150; and the chord portion of the cross-sectional contour line of the string-shaped molded body 11 is brought into close contact with the inner wall surface of the lid member 14. However, as long as the deformation of the string-shaped molded body 11 in a storage state in the package 10 can be prevented, there may be adopted a mode in which the outer peripheral surface of the string-shaped molded body 11 is brought into partial contact with the inner wall surfaces of the lid member 14 and the groove 150 (in other words, a mode in which a partial gap is formed).

The planar shape of the string-shaped molded body 11 is preferably linear or looped.

A looped string-shaped molded body 11A, 11B has a length suited for building on the peripheral edge portion of the mucosal surface (i.e., the denture border 3A, 3B) of the reference denture 1A, 1B to be used for the production of the denture 4A, 4B. In this case, a circumferential length X of the looped string-shaped molded body 11A, 11B is preferably set equal to a circumferential length Y of the denture border 3A, 3B, or slightly longer than the circumferential length of the denture border 3A, 3B (a length of more than 100% and 130% or less with respect to the circumferential length Y). When a variation exists in size of the reference denture 1A, 1B, there exist a plurality of kinds of circumferential lengths Y (i.e., circumferential lengths Y1, Y2, Y3 . . . ) in accordance with the size variation. In this case, it is preferred that the looped string-shaped molded body 11A, 11B is also set to have a plurality of kinds of circumferential lengths X in accordance with the size variation of the reference denture 1A, 1B. For example, when there exist circumferential lengths Y1, Y2 . . . . Yn corresponding to a size variation of "n" kinds of the reference denture 1A, 1B, the looped string-shaped molded body 11A, 11B may be set to have circumferential lengths X1, X2 . . . . Xn in correspondence to the circumferential lengths Y1, Y2 . . . . Yn, respectively. Here, "n" represents an integer of 1 or more.

Meanwhile, a linear string-shaped molded body 11C is easy to adjust to an appropriate length, for example, by combining two or more pieces thereof or by being cut as required. Accordingly, the length of the linear string-shaped molded body 11C is not particularly limited. However, the linear string-shaped molded body 11C preferably has a length suited for building on the peripheral edge portion of the mucosal surface of the reference denture 1A, 1B (i.e., the denture border 3A, 3B) through (1) use of one piece of the string-shaped molded body 11C, or has a length suited for building on the peripheral edge portion of the mucosal surface of the reference denture 1A, 1B (i.e., the denture border 3A, 3B) through (2) use of a combination of two pieces of the string-shaped molded body 11C. Here, in the case set forth in the above-mentioned item (1), the length X of the string-shaped molded body 11C is preferably set equal to the circumferential length Y of the denture border 3A, 3B of the reference denture 1A, 1B to be used for the production of a denture, or slightly longer than the circumferential length of the denture border 3A, 3B (a length of more than 100% and 130% or less with respect to the circumferential length Y).

When the planar shape of the string-shaped molded body 11C is linear or rodlike as illustrated in FIGS. 5(*a*) and 5(*b*), the string-shaped molded body 11 can even be simultaneously molded by extrusion molding, and filled into a groove 150C of a tray 151C without a gap with the inner wall surface of the groove 150C. In this case, the planar shape, cross-sectional shape, and length of the groove 150C are matched with the planar shape, cross-sectional shape, and length of the string-shaped molded body 11C, respectively.

Specific examples of the package 10 according to this embodiment have been described in detail above with reference to FIGS. 3(*a*) and 3(*b*) to FIGS. 5(*a*) and 5(*b*). However, those examples have been merely shown as an embodiment, and the package 10 according to this embodiment is not limited only to the specific modes exemplified in FIGS. 3(*a*) and 3(*b*) to FIGS. 5(*a*) and 5(*b*).

5. Use Method for Package According to this Embodiment

When a denture is produced by using the package according to this embodiment, the production may be performed by the following procedure. That is, a building and transfer step of (A) building a photocurable denture base material having plastic deformability in at least one building target region on a reference denture, the at least one building target region being selected from at least a part of the denture border and at least a part of the mucosal surface, and then, (B1) placing the reference denture having the photocurable denture base material built thereon at an appropriate position in an oral cavity of a patient, and then transferring a mucosal shape of the oral cavity of the patient onto the photocurable denture base material and simultaneously forming a margin to remove the excess photocurable denture base material, or (B2) placing the reference denture having the photocurable denture base material built thereon at an appropriate position on an imaginary occlusal plane in an articulator having a patient oral cavity model attached thereto, and then transferring a shape of the patient oral cavity model onto the photocurable denture base material and simultaneously forming a margin to remove the excess photocurable denture base material; and a curing step of curing the photocurable denture base material after the building and transfer step are performed. Here, when the photocurable denture base material is built in the building target region, the photocurable denture base material to be used is the string-shaped molded body taken out of the denture base material package according to this embodiment. When the photocurable denture base material is built in a region including at least a part of the denture border, it is preferred that a planar shape of the string-shaped molded body defined by the groove be a shape corresponding to a planar shape of the at least a part of the denture border.

Now, description is given of cases in which, in the production method for a denture involving using the reference denture as described in WO 2020/195623 A1, the building and transfer step (C) is performed using the package 10 according to this embodiment exemplified in FIGS. 3(*a*) and 3(*b*) to FIGS. 5(*a*) and 5(*b*).

First, in the case of using a package 10A, 10B illustrated in FIGS. 3(*a*) and 3(*b*) and FIGS. 4(*a*) and 4(*b*), a bag body 12A, 12B illustrated in FIGS. 3(*a*) and 3(*b*) and FIGS. 4(*a*) and 4(*b*) is opened, and a tray 151A, 151B in a state in which the opening of the groove 150A, 150B is hermetically closed with a lid member 14A, 14B is taken out. Next, the lid member 14A, 14B is peeled from the tray 151A, 151B, and then the string-shaped molded body 11A, 11B whose planar shape is looped accommodated in the groove 150A, 150B is taken out. After that, with use of the string-shaped molded body 11A, 11B thus taken out, the building and transfer step (C) is performed for the reference denture 1A, 1B. In addition, also in the case of using a package 10C illustrated in FIGS. 5(*a*) and 5(*b*), the string-shaped molded body 11C whose planar shape is linear (i.e., rodlike) accommodated in the groove 150C is taken out by the same procedure as in the case of using the package 10A, 10B illustrated in FIGS. 3(*a*) and 3(*b*) and FIGS. 4(*a*) and 4(*b*). After that, the length and planar shape of the string-shaped molded body 11C thus taken out are adjusted so that the string-shaped molded body 11C may have a shape suited for building on the reference denture 1A, 1B. In this case, the adjustment of the length is performed by appropriately cutting the string-shaped molded body 11C or connecting pieces thereof, and the adjustment of the planar shape is performed by appropriately curving the string-shaped molded body 11C. The building and transfer step (C) is performed in the same manner as in the case of using the package 10A, 10B illustrated in FIGS. 3(*a*) and 3(*b*) and FIGS. 4(*a*) and 4(*b*) except those operations.

In the central building and transfer step (C1), the linear (i.e., rodlike) string-shaped molded body 11C illustrated in FIGS. 5(*a*) and 5(*b*) may be particularly suitably used. In this case, the linear (i.e., rodlike) string-shaped molded body 11C (or a part thereof) is placed on the mucosal surface 4A1 (or the mucosal surface 4B1) of the base central region 5A1 (or the base central region 5B1) illustrated in FIG. 2(*a*) (or FIG. 2(*b*)) so that the chord portion of the cross-sectional contour line of the linear string-shaped molded body 11C faces the lower side in FIG. 2(*a*) (or the upper side in FIG. 2(*b*)). After that, the reference denture 1A (or the reference denture 1B) having the string-shaped molded body 11C built thereon is placed at an appropriate position in the oral cavity of a patient or on an imaginary occlusal plane in an articulator, and a mucosal shape of the oral cavity of the patient or a shape of a patient oral cavity model is transferred onto the photocurable denture base material (the string-shaped molded body 11C that has been built).

In addition, in the anterior building and transfer step (C2) and the posterior building and transfer step (C3), the looped string-shaped molded body 11A, 11B illustrated in FIGS. 3(*a*) and 3(*b*) and FIGS. 4(*a*) and 4(*b*) may be particularly suitably used. In this case, the building of the looped string-shaped molded body 11A, 11B on the denture border 3A, 3B of the reference denture 1A, 1B is suitably performed by a procedure set forth in the following item (1) or (2). That is, (1) first, the opening of the groove 150A, 150B of the tray 151A, 151B in a state in which the lid member 14A, 14B has been removed is brought into a state of facing upward. Next, the reference denture 1A, 1B is placed on the upper surface of the string-shaped molded body 11A, 11B accommodated in the groove 150A, 150B so that the mucosal surface faces downward, and the denture border 3A, 3B portion of the reference denture 1A, 1B is brought into close contact with the string-shaped molded body 11A, 11B. Alternatively, (2) the procedure set forth in the above-mentioned item (1) is performed under a state in which the positional relationship between the tray 151A, 151B and the reference denture 1A, 1B in a vertical direction is reversed.

In addition, the linear (i.e., rodlike) string-shaped molded body 11C illustrated in FIGS. 5(*a*) and 5(*b*) may also be used for the building of the string-shaped molded body 11 on the denture border 3A, 3B of the reference denture 1A, 1B. In this case, the string-shaped molded body 11C may be used in a state of having been cut (or two or more pieces of the string-shaped molded body 11C having been connected) so as to have a shape suited for building on the reference denture 1A, 1B, and been curved. (3) That is, the planar shape of the string-shaped molded body 11C is curved so as to correspond to the planar shape and length of the peripheral edge portion of the mucosal surface of the reference denture 1A, 1B (the denture border 3A, 3B), and its length is adjusted. Next, the chord portion (linear portion) of the cross-sectional contour line of the string-shaped molded body 11C having its planar shape and length adjusted is brought into close contact with the denture border 3A, 3B of the reference denture 1A, 1B. This operation is performed under a state in which the string-shaped molded body 11C is positioned on an upward side with respect to the reference denture 1A, 1B in a vertical direction.

After that, the reference denture 1A, 1B having the string-shaped molded body 11 built thereon by any one of the building procedures set forth in the above-mentioned items (1) to (3) is placed at an appropriate position in the oral cavity of a patient or on an imaginary occlusal plane in an articulator, and a mucosal shape of the oral cavity of the patient or a shape of a patient oral cavity model is transferred onto the photocurable denture base material (the string-shaped molded body 11 that has been built). In addition, approximately simultaneously with the transfer, formation of a margin is performed to remove the excess photocurable denture base material.

As described above, when the package 10 according to this embodiment is used, in the case of producing a denture by the production method for a denture as described in WO 2020/195623 A1, the building and transfer step (C), in particular, the anterior building and transfer step (C2) and/or the posterior building and transfer step (C3), can be efficiently and stably performed.

The invention claimed is:

1. A denture base material package, comprising:

a string-shaped molded body obtained by molding a photocurable denture base material having plastic deformability into a string shape; and a light-shielding member having an internal space kept airtight, and accommodating the string-shaped molded body in the internal space, wherein the light-shielding member includes:

(i) a tray having a groove for accommodating the string-shaped molded body; and (ii) at least one kind of member selected from the group consisting of: a bag body configured to house the tray thereinside; and a lid member configured to seal an opening of the groove, and wherein the tray has a thickness of from 100 μm to 2,000 μm.

2. The denture base material package according to claim 1, wherein the string-shaped molded body has a cross-sectional area falling within a range of from 20 $mm^2$ to 65 $mm^2$.

3. The denture base material package according to claim 1, wherein a cross-sectional shape of the string-shaped molded body in a cross-section orthogonal to a longitudinal direction thereof is a semicircular shape or a crescent shape.

4. The denture base material package according to claim 1, wherein a planar shape of the string-shaped molded body defined by the groove is linear or looped.

5. The denture base material package according to claim 1, wherein, when a denture is produced by using:

the string-shaped molded body; and a reference denture having (i) a mucosal surface that is a surface facing an alveolar ridge mucosa, (ii) a polished surface that is a surface capable of being brought into contact with at least one of a buccal mucosa or a tongue, and (iii) a denture border that forms a boundary between the mucosal surface and the polished surface, a planar shape of the string-shaped molded body defined by the groove is a shape corresponding to at least a part of a planar shape of the denture border of the reference denture.

6. The denture base material package according to claim 5, wherein the planar shape of the string-shaped molded body defined by the groove is a looped shape corresponding to the planar shape of the denture border of the reference denture.

7. The denture base material package according to claim 5, wherein the reference denture includes a maxillary reference denture, and wherein, in the maxillary reference denture, (1) when a length of a line segment PQ connecting a point P corresponding to a left pterygomaxillary notch of the denture border on a throat side and a point Q corresponding to a right pterygomaxillary notch of the denture border on the throat side is defined as 1, a line segment OM connecting a point O corresponding to an upper lip frenulum, which corresponds to a midline portion of the denture border on a labial side, and a midpoint M of the line segment PQ has a length of from 0.76 to 0.98, and (2) when points that equally divide a line segment OP connecting the point O and the point P into four parts are designated as a point P1, a point P2, and a point P3from the point O side, and points at which perpendicular lines from the point P1, the point P2, and the point P3 on the line segment OP intersect the denture border on a left buccal side are designated as a point D1, a point D2, and a point D3, respectively, and points that equally divide a line segment OQ connecting the point O and the point Q into four parts are designated as a point Q1, a point Q2, and a point Q3 from the point O side, and points at which perpendicular lines from the point Q1,the point Q2, and the point Q3 on the line segment OQ intersect the denture border on a right buccal side are designated as a point E1, a point E2, and a point E3,respectively, a line segment P1D1 and a line segment Q1E1 each have a length of from 0.11 to 0.36, a line segment P2D2 and a line segment Q2E2 each have a length of from 0.19 to 0.45, and a line segment P3D3 and a line segment Q3E3 each have a length of from 0.16 to 0.45.

8. The denture base material package according to claim 5, wherein the reference denture includes a mandibular reference denture, and wherein, in the mandibular reference denture, (1) when a length of a line segment pq connecting a point "p" corresponding to a left retromolar pad of the denture border on a throat side and a point "q" corresponding to a right retromolar pad of the denture border on the throat side is defined as 1, a line segment om connecting a point "o" corresponding to a lower lip frenulum, which corresponds to a midline portion of the denture border on a labial side, and a midpoint "m" of the line segment pq has a length of from 0.74 to 0.94, (2) when points that equally divide a line segment op connecting the point "o" and the point "p" into four parts are designated as a point p1, a point p2,and a point p3 from the point "o" side, and points at which perpendicular lines from the point p1, the point p2, and the point p3 on the line segment op intersect the denture border on a left buccal side are designated as a point d1, a point d2, and a point d3, respectively, and points that equally divide a line segment oq connecting the point "o" and the point "q" into four parts are designated as a point q1, a point q2, and a point q3 from the point "o" side, and points at which perpendicular lines from the point q1,the point q2, and the point q3 on the line segment oq intersect the denture border on a right buccal side are designated as a point e1, a point e2, and a point e3,respectively, a line segment p1d1 and a line segment q1e1 each have a length of from 0.11 to 0.32, a line segment p2d2 and a line segment q2e2 each have a length of from 0.13 to 0.34, and a line segment p3d3 and a line segment q3e3 each have a length of from 0.14 to 0.33, and (3) when points at which perpendicular lines from the point p1, the point p2, and the point p3 on the line segment op intersect the denture border on the throat side are designated as a point b1, a point b2, and a point b3, respectively, and points at which perpendicular lines from the point q1, the point q2, and the point q3on the line segment oq intersect the denture border on the throat side are designated as a point c1, a point c2, and a point c3, respectively, a line segment d1b1 and a line segment e1c1 each have a length of from 0.14 to 0.40, a line segment d2b2 and a line segment e2c2 each have a length of from 0.19 to 0.41, and a line segment d3b3 and a line segment e3c3 each have a length of from 0.21 to 0.42.

9. A production method for a denture, comprising:

a building and transfer step of (A) building a photocurable denture base material having plastic deformability in at least one building target region on a reference denture, the reference denture having (i) a mucosal surface that is a surface facing an alveolar ridge mucosa, (ii) a polished surface that is a surface capable of being brought into contact with at least one of a buccal mucosa or a tongue, and (iii) a denture border that forms a boundary between the mucosal surface and the polished surface, the at least one building target region being selected from at least a part of the denture border and at least a part of the mucosal surface, and then, (B1) placing the reference denture having the photocurable denture base material built thereon at an appropriate position in an oral cavity of a patient, and then transferring a mucosal shape of the oral cavity of the patient onto the photocurable denture base material and simultaneously forming a margin to remove the excess photocurable denture base material, or (B2) placing the reference denture having the photocurable denture base material built thereon at an appropriate position on an imaginary occlusal plane in an articulator having a patient oral cavity model attached thereto, and then transferring a shape of the patient oral cavity model onto the photocurable denture base material and simultaneously forming a margin to remove the excess photocurable denture base material; and a curing step of curing the photocurable denture base material after the building and transfer step, wherein, when the photocurable denture base material is built in the building target region, the photocurable denture base material to be used is the string-shaped molded body taken out of the denture base material package of claim 1.

10. The production method for a denture according to claim 9, wherein, when the photocurable denture base material is built in a region including at least a part of the denture border, a planar shape of the string-shaped molded body defined by the groove is a shape corresponding to a planar shape of the at least a part of the denture border.

11. A denture base material package, comprising:

a string-shaped molded body obtained by molding a photocurable denture base material having plastic deformability into a string shape; and a light-shielding member having an internal space kept airtight, and accommodating only the string-shaped molded body in the internal space, wherein the light-shielding member includes:

(i) a tray having a groove for accommodating the string-shaped molded body; and (ii) at least one kind of member selected from the group consisting of: a bag body configured to house the tray thereinside; and a lid member configured to seal an opening of the groove.

12. The denture base material package according to claim 11, wherein the string-shaped molded body has a cross-sectional area falling within a range of from 20 $mm^2$ to 65 $mm^2$.

13. The denture base material package according to claim 11, wherein a cross-sectional shape of the string-shaped molded body in a cross-section orthogonal to a longitudinal direction thereof is a semicircular shape or a crescent shape.

14. The denture base material package according to claim 11, wherein a planar shape of the string-shaped molded body defined by the groove is linear or looped.

15. The denture base material package according to claim 11, wherein, when a denture is produced by using:

the string-shaped molded body; and a reference denture having (i) a mucosal surface that is a surface facing an alveolar ridge mucosa, (ii) a polished surface that is a surface capable of being brought into contact with at least one of a buccal mucosa or a tongue, and (iii) a denture border that forms a boundary between the mucosal surface and the polished surface, a planar shape of the string-shaped molded body defined by the groove is a shape corresponding to at least a part of a planar shape of the denture border of the reference denture.

16. The denture base material package according to claim 15, wherein the planar shape of the string-shaped molded body defined by the groove is a looped shape corresponding to the planar shape of the denture border of the reference denture.

17. The denture base material package according to claim 15, wherein the reference denture includes a maxillary reference denture, and wherein, in the maxillary reference denture, (1) when a length of a line segment PQ connecting a point P corresponding to a left pterygomaxillary notch of the denture border on a throat side and a point Q corresponding to a right pterygomaxillary notch of the denture border on the throat side is defined as 1, a line segment OM connecting a point O corresponding to an upper lip frenulum, which corresponds to a midline portion of the denture border on a labial side, and a midpoint M of the line segment PQ has a length of from 0.76 to 0.98, and (2) when points that equally divide a line segment OP connecting the point O and the point P into four parts are designated as a point P1, a point P2, and a point P3 from the point O side, and points at which perpendicular lines from the point P1, the point P2, and the point P3 on the line segment OP intersect the denture border on a left buccal side are designated as a point D1, a point D2, and a point D3,respectively, and points that equally divide a line segment OQ connecting the point O and the point Q into four parts are designated as a point Q1, a point Q2, and a point Q3 from the point O side, and points at which perpendicular lines from the point Q1,the point Q2, and the point Q3 on the line segment OQ intersect the denture border on a right buccal side are designated as a point E1, a point E2, and a point E3,respectively, a line segment P1D1 and a line segment Q1E1 each have a length of from 0.11 to 0.36, a line segment P2D2 and a line segment Q2E2 each have a length of from 0.19 to 0.45, and a line segment P3D3 and a line segment Q3E3 each have a length of from 0.16 to 0.45.

18. The denture base material package according to claim 15, wherein the reference denture includes a mandibular reference denture, and wherein, in the mandibular reference denture, (1) when a length of a line segment pq connecting a point "p" corresponding to a left retromolar pad of the denture border on a throat side and a point "q" corresponding to a right retromolar pad of the denture border on the throat side is defined as 1, a line segment om connecting a point "o" corresponding to a lower lip frenulum, which corresponds to a midline portion of the denture border on a labial side, and a midpoint "m" of the line segment pq has a length of from 0.74 to 0.94, (2) when points that equally divide a line segment op connecting the point “o” and the point “p” into four parts are designated as a point p1, a point p2,and a point p3 from the point “o” side, and points at which perpendicular lines from the point p1, the point p2, and the point p3 on the line segment op intersect the denture border on a left buccal side are designated as a point d1, a point d2, and a point d3, respectively, and points that equally divide a line segment oq connecting the point “o” and the point “q” into four parts are designated as a point q1, a point q2, and a point q3 from the point “o” side, and points at which perpendicular lines from the point q1,the point q2, and the point q3 on the line segment oq intersect the denture border on a right buccal side are designated as a point e1, a point e2, and a point e3,respectively, a line segment p1d1 and a line segment q1e1 each have a length of from 0.11 to 0.32, a line segment p2d2 and a line segment q2e2 each have a length of from 0.13 to 0.34, and a line segment p3d3 and a line segment q3e3 each have a length of from 0.14 to 0.33, and (3) when points at which perpendicular lines from the point p1, the point p2, and the point p3 on the line segment op intersect the denture border on the throat side are designated as a point b1, a point b2, and a point b3, respectively, and points at which perpendicular lines from the point q1, the point q2, and the point q3on the line segment oq intersect the denture border on the throat side are designated as a point c1, a point c2, and a point c3, respectively, a line segment d1b1 and a line segment e1c1 each have a length of from 0.14 to 0.40, a line segment d2b2 and a line segment e2c2 each have a length of from 0.19 to 0.41, and a line segment d3b3 and a line segment e3c3 each have a length of from 0.21 to 0.42.

* * * * *